United States Patent [19]

Renner

[11] 3,716,483
[45] Feb. 13, 1973

[54] PROCESS FOR REMOVING ORGANIC SUBSTANCES FROM WATER

[75] Inventor: Alfred Renner, Muenchenstein, Switzerland

[73] Assignee: Ciba-Geigy, Basel, Switzerland

[22] Filed: July 21, 1970

[21] Appl. No.: 56,955

[30] Foreign Application Priority Data

Aug. 1, 1969 Switzerland..................11754/69

[52] U.S. Cl..............................210/40, 210/DIG. 21
[51] Int. Cl. .............................................E02b 15/04
[58] Field of Search....................210/30, 40, DIG. 21

[56] References Cited

UNITED STATES PATENTS

| 3,518,183 | 6/1970 | Evans | 210/40 |
| 3,536,615 | 10/1970 | Bunn | 210/40 X |
| 3,598,729 | 8/1971 | Baumann | 210/40 |

OTHER PUBLICATIONS

"Oil Spill Treating Agents A Compendium," Battelle Memorial Institute, Pacific Northwest Laboratories, Richland, Washington, May 1, 1970, P. 121.

Primary Examiner—Samih N. Zaharna
Attorney—Harry Goldsmith, Joseph G. Kolodny and Mario A. Monaco

[57] ABSTRACT

Process for removing dissolved, emulsified or suspended organic substances, for example fat, resin, oil or dyestuff, from water in which the contaminated water is brought into contact with a highly disperse, solid, water-insoluble organic polymer, for example melamine-formaldehyde resin or polyacrylonitrile of average molecular weight greater than 1,000 and a specific surface area greater than 5 $m^2/g$, and the polymer charged with the contamination is separated from the water.

3 Claims, No Drawings

PROCESS FOR REMOVING ORGANIC SUBSTANCES FROM WATER

Progressive industrialization brings with it an increased amount of spent oils, lubricating greases, liquid synthetic resins, paints and dyestuffs. In many cases, especially when cleaning installations and machines, these substances arise as heterogeneous mixtures with water, as emulsions or suspensions or, in the case of dyestuffs, also as solutions. Such effluents would lead to an impermissible contamination of waters. Examples of sources of such effluents are mechanical workshops, painting shops, engineering factories, garages and paint factories as well as chemical factories.

The transport industry also is responsible for constantly increasing dangers of contamination of waters. A number of shipping disasters have already occurred in which the contents of large oil tankers have led to the contamination of whole sections of the sea and to the partial destruction of the local fauna. Accidents to tankers on roads have frequently already endangered the water supply of large areas.

These unattractive concomitant phenomena of modern technology, industry and transport, result in a demand for substances which (a) are capable of adsorbing large amounts of the waste materials mentioned, (b) can easily be separated from the water after having been charged with the waste substance, (c) can be burnt, leaving as little residue as possible, after having been separated from the water. (d) Since the purification of water increasingly adds to manufacturing costs and transport costs, such substances should be easily accessible and as cheap as possible.

At the present time no water purification agents exist which satisfy requirements (a)–(d).

The subject of the invention is therefore a process for the removal of organic substances from water which for the first time simultaneously fulfils the practical requirements mentioned and which is characterized in that the contaminated water is brought into contact with a highly disperse, solid, water-insoluble organic polymer of average molecular weight greater than 1,000 and a specific surface area greater than 5 m$^2$/g and that the polymer charged with the impurity is separated from the water.

The highly disperse solid polymers with a molecular weight greater than 1,000 and a specific surface area >5 m$^2$/g preferably consist of micro-particles in the micron or submicron range. The specific surface area can also include so-called "internal surface area," as is to be found in porous or spongy structures. The specific surface area can for example be determined by adsorption of nitrogen according to the so-called BET method or simply according to the method of Haul and Dümbgen (compare Chem. Ing. Technik 32 (1960) and Chem. Ing. Technik 35 (1963) 586).

The highly disperse polymers used in the process according to the invention can be linear, branched or cross-linked. They can be synthesized by polymerization, polycondensation or polyaddition reactions or by combinations of such reactions.

Examples of such polymers are: cross-linked polycondensation resins, above all cross-linked aminoplastics, such as urea-formaldehyde resins and melamine-formaldehyde resins; also, vinyl polymers such as polyacrylonitrile.

Highly disperse polymers are in general obtained in the presence of protective colloids or surface-active substances. At the same time the observation of very specific reaction conditions (concentration, pH-value, or redox system) is necessary to achieve high specific surface areas. Some of these processes, and the structure and properties of such polymers, are described in the literature [compare British Pat. specification No. 1,043,437 and U.S.A. Pat. No. 3,428,607, and also Makromol. Chemie 120, 68–86 (1968)].

The highly disperse polymer can be brought into contact with the contaminated water by stirring or by vibration. A further possibility consists of passing the contaminated water over a fixed layer of the polymeric substance. If it is intended to remove oil films which are spread over water surfaces, the highly disperse polymer is sprinkled or sprayed as uniformly as possible onto the liquid surface.

If emulsions are to be separated, it is appropriate to add inorganic salts which accelerate the breaking of the emulsion. The cations of polyvalent metals such as Al, Fe, Ca, and Mg are particularly active in this respect.

The charged polymers are separated off mechanically. For example, an oil film adsorbed on a highly disperse polymer can be stripped from the water surface by combs or nets. If effluents containing oil, fat, resin or colors are regularly produced in a factory, it is advisable to separate off the charged polymer by means of a filtration installation. The use of a filter aid, such as kieselguhr or the kieselguhr preparations commercially available under the registered tradename "Celite" is here of value.

Highly disperse organic polymers absorb a multiple of their own weight of oil, fat or resin. In this respect they are distinctly superior to inorganic, highly disperse substances such as for example pyrogenic silica. For some uses of these polymers, their ability to be degraded under biological conditions can be of significance.

Nitrogen-containing polymers such as polyacrylonitrile, as well as those based on melamine-formaldehyde and urea-formaldehyde, are therefore preferred adsorbents. Highly disperse, cross-linked urea-formaldehyde polymer is especially preferred because of its low price and its ease of manufacture.

In the examples which follow, parts denote parts by weight and percentages denote percentages by weight.

EXAMPLE 1

140 parts of highly disperse polymer, 140 parts of kieselguhr, 108 parts of calcium formate and 12 parts of silicone oil are well mixed in a Lödige mixer.

As the highly disperse polymer, a highly disperse crosslinked melamine-formaldehyde resin, manufactured according to the data of Example 12 of French Pat. specification No. 1,453,570, is used in experiment 1.

In experiment 2, a crosslinked urea-formaldehyde resin, manufactured according to Example 1 of Swiss Application 4,169/68 (Case 6,418) is used as the highly disperse polymer. In experiment 3, a polyacrylonitrile of specific surface area 65 m$^2$/g is used as the highly disperse polymer. For comparison, a blank experiment (experiment 4) was carried out with 140 parts of kieselguhr alone (specific surface area 28 m$^2$/g), and also a comparison experiment with 140 parts of pyrogenic silica aerogel (registered tradename "AEROSIL" of Messrs. Degussa), which has a specific surface area of 220 m², and 140 parts of kieselguhr (experiment 5).

The oil adsorption test for the assessment of various highly disperse polymers was carried out as follows: 8–16 parts of spent motor oil were dispersed in 200 parts of water in a beaker by means of a vibro-mixer. 4 parts of the above mixture are added and the vibration continued for some minutes. The way in which the oil detaches from the wall of the container and is taken up by the polymer is observed. The polymer is filtered off and the filtrate is examined for freedom from oil. In a series of experiments with increasing amounts of oil, the amount of oil which still just gives an oil-free filtrate, is determined. The results are presented in the table which follows.

| Experiment No. | Highly disperse material | Specific Surface area m²/g | Maximum oil absorption part | % |
|---|---|---|---|---|
| 1 | Melamine-formaldehyde resin | 150 | 14 | 350 |
| 2 | Urea-formaldehyde resin | 75 | 15 | 375 |
| 3 | Polyacrylonitrile | 65 | 10 | 250 |
| 4 (blank experiment) | (Kieselguhr alone) | 28 | <8 | <200 |
| 5 (comparison experiment) | Silica aerogel ("Aerosil") | 220 | 12 | 300 |

EXAMPLE 2

A dyestuff solution contains 1 part of the pyrazolone dyestuff of formula

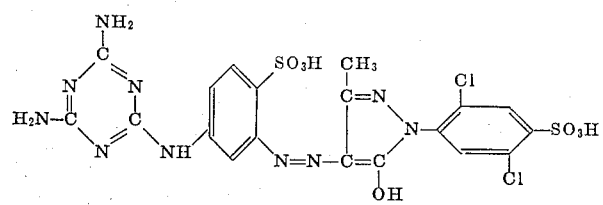

per 1000 parts. It is a deep yellow color. It is acidified to pH 2–3, 7.5 parts of highly disperse melamine-formaldehyde polymer (manufactured according to Example 1 of French Patent Specification 1,453,570) are added, and the mixture is heated to 90° C. and vibrated for 3 minutes. Thereafter all the dyestuff has been taken up by the polymer (13.3 percent). The polymer charged with dyestuff settles out well. The supernatant, absolutely colorless solution can easily be decanted.

EXAMPLE 3

A sample of effluent contains 2.5 percent by weight of an emulsified lacquer resin of the following composition:

| | |
|---|---|
| castor oil alkyd resin ("Beckosol 241"): | 30 parts |
| melamine-formaldehyde resin etherified with butanol ("Cibamine M 86") | 16.5 parts |
| silicone oil (1% in toluene) | 0.5 part |
| titanium dioxide | 28 parts |
| xylene | 23 parts |
| butanol | 2 parts |

If 200 parts of the above emulsion are stirred with 1 part of a highly disperse urea-formaldehyde polymer according to Example 1 of Swiss application No. 4,169/68 and with 0.5 part of aluminum sulphate, a clear effluent is obtained after filtration. Its light transmission at wavelengths of 460, 530 and 650 m$\mu$ is 99.5 percent, which indicates that the water is free of the constituents of the lacquer resin.

EXAMPLE 4

The effluent from a factory manufacturing epoxide resins contains 1 percent by weight of emulsified resin which essentially corresponds to the diglycidyl ether of bisphenol A. If 100 parts of this effluent are treated with 0.5 part of a highly disperse urea-formaldehyde polymer, the manufacture of which is described in Example 1 of Swiss Application No. 4,169/68, an absolutely resin-free effluent is obtained after filtration, as can be seen from the light absorption measurements at 460, 530 and 650 m$\mu$.

EXAMPLE 5

An emulsion contains 2.5 percent by weight of cutting oil (Chevron Soluble TR). 200 parts of this emulsion are stirred for 30 minutes with 2.5 parts of the effluent cleansing agent which was used in the present Example 1, experiment No. 2. After filtration, the light transmission of the water is:

| | |
|---|---|
| at 460 m$\mu$ | 97 % |
| at 530 m$\mu$ | 98 % |
| at 650 m$\mu$ | 100 % |

The filtrate is practically oil-free.

I claim:

1. In a process for removing dissolved, emulsified or suspended organic substances from water by bringing the contaminated water into contact with an absorbent and by separating the absorbent charged with the contamination from the water, the improvement which consists in using as the absorbent, highly disperse, solid, water-insoluble organic polymer micro-particles in the micron or submicron range of average molecular weight greater than 1,000 and a specific surface area greater than 5 m²/g, and selected from the group consisting of a highly disperse, crosslinked, insoluble melamine-formaldehyde resin and a highly disperse, crosslinked, insoluble urea-formaldehyde resin.

2. A process as claimed in claim 1, wherein a highly disperse, crosslinked, insoluble melamine-formaldehyde resin is used as the absorbent.

3. A process as claimed in claim 1, wherein a highly disperse, crosslinked, insoluble urea-formaldehyde resin is used as the absorbent.

* * * * *